E. SEAVEY.
BELT FASTENER.
APPLICATION FILED FEB. 9, 1917.
1,275,772.
Patented Aug. 13, 1918.
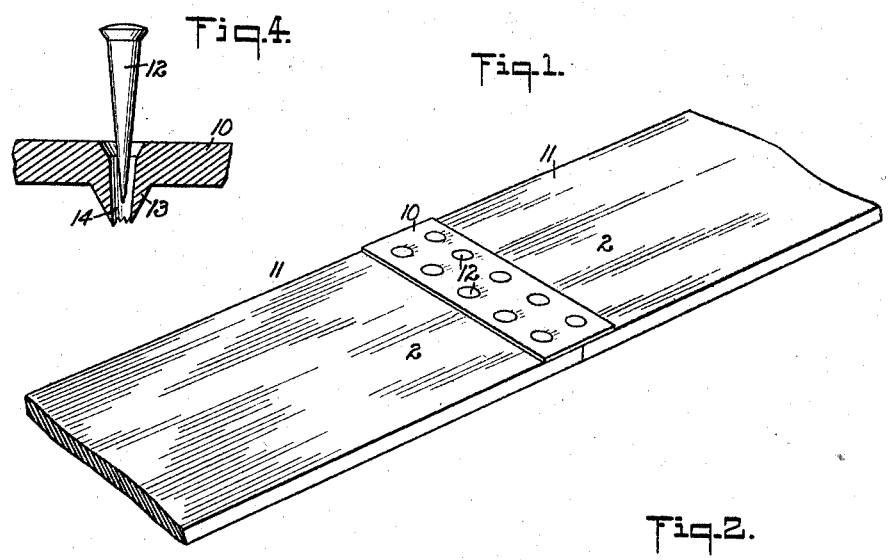
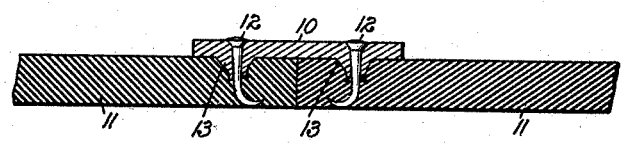
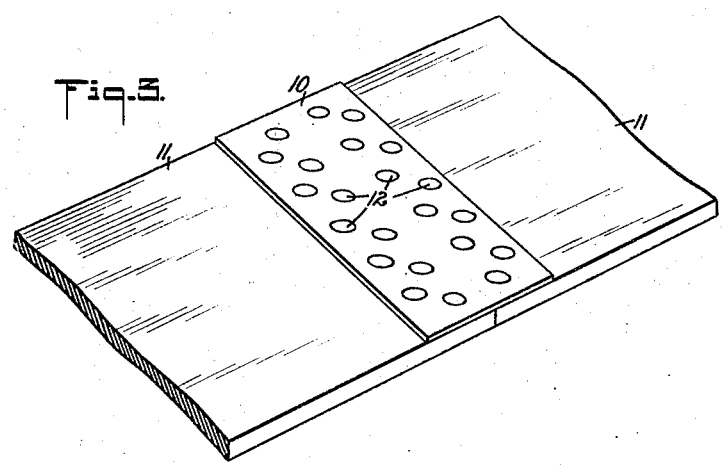
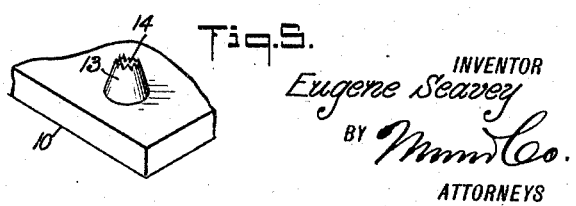
WITNESSES
INVENTOR
Eugene Seavey
BY
ATTORNEYS

UNITED STATES PATENT OFFICE.

EUGENE SEAVEY, OF NEW YORK, N. Y.

BELT-FASTENER.

1,275,772.     Specification of Letters Patent.     Patented Aug. 13, 1918.

Application filed February 9, 1917. Serial No. 147,586.

*To all whom it may concern:*

Be it known that I, EUGENE SEAVEY, a citizen of the United States, and a resident of the city of New York, borough of Manhattan, in the county and State of New York, have invented a new and Improved Belt Fastener, of which the following is a full, clear, and exact description.

The object of the invention is to provide a new and improved belt fastener arranged to firmly unite the ends of the belt and to provide a smooth under surface to insure an easy passage of the belt joint over the pulley surfaces.

In order to accomplish the desired result, use is made of a plate provided with struck-up apertured bosses having ragged edges and projecting from the under surface of the plate, the said bosses being driven into the belt material, and tacks driven through the said bosses and clenched on the under side of the belt, the tacks having heads and shanks, of which the latter have the portions adjacent the head somewhat larger in diameter than the openings in the bosses to spread the walls of the bosses sidewise in the belt material on driving the tacks home.

A practical embodiment of the invention is represented in the accompanying drawings forming a part of this specification, in which similar characters of reference indicate corresponding parts in all the views.

Figure 1 is a perspective view of the belt fastener as applied;

Fig. 2 is an enlarged longitudinal section of the same, on the line 2—2 of Fig. 1;

Fig. 3 is a perspective view of a modified form of the belt fastener as applied;

Fig. 4 is an enlarged sectional side elevation of a portion of the plate and one of the bosses with a tack in position to be driven through the boss; and Fig. 5 is an enlarged perspective view of a portion of the under side of the plate.

A plate 10 of a length corresponding approximately to the width of the belt 11 is adapted to be fastened to the adjacent ends of the belt 11 by tacks 12, the plate 10 overlying the joint of the abutting ends of the belt 11. The plate 10 is provided at each side with one or more rows of struck-up apertured bosses 13, preferably made conical and projecting from the under side of the plate 10 to be driven into the material of the belt 11, as plainly indicated in Figs. 2 and 4. Each boss 13 has a ragged wall (see Fig. 5) and the diameter of the tapering opening 14 in the boss is made somewhat less than the diameter of the portion of the tapering shank adjacent the conical head thereof of a tack. The upper end of the aperture 14 of each boss 13 is counter sunk to receive the conical head of the tack 12 thus presenting no undesirable projection on the top of the plate 10.

The belt fastener is used as follows: The plate 10 is placed in position on the outer surface of the belt 11 at the joint of the belt ends, as plainly indicated in the drawings, and then the plate is forced downward by a blow from a hammer or other tool to embed the bosses 13 in the belt material. The operator now drives the tacks 12 into the apertures 14 of the bosses 13 whereby the shank portions adjacent the heads spread the bosses 14 in a sidewise direction into the belt material to cause the plate 10 to firmly adhere to the belt. The points of the tacks 12 extend through the belt material to the under side of the belt and are then clenched, as plainly indicated in Fig. 2, to prevent the tacks from becoming loose and detached, at the same time the clenched ends present no undesirable projections on the under surface of the belt to insure a smooth passage of the belt over the pulley surfaces. It is understood that the bosses 13 on account of being spread in the belt material hold the plate in place and at the same time the shanks of the tacks 12 are wedged by the bosses so that a very rigid structure is provided, not liable to become loose.

For narrow belts one transverse row of apertured bosses is sufficient on each side of the plate 10, but for wider or heavier belts two such rows are preferably used on each side of the plate, the bosses of the two rows being arranged in staggered relation, as plainly indicated in Fig. 3.

The belt fastener shown and described is very simple and durable in construction and can be readily fastened in position on the belt to firmly join the abutting ends thereof.

Having thus described my invention, I claim as new and desire to secure by Letters Patent:—

1. A belt fastener, comprising a plate provided with struck-up apertured bosses having ragged edges and projecting from the under surface of the plate, the said bosses being adapted to be driven into the belt material, and tacks driven through the said bosses and clenched on the under side of the belt, the tacks having heads and shanks, the portions of the shanks adjacent the heads being somewhat larger in diameter than the openings in the bosses to spread the walls of the bosses sidewise in the belt material on driving the tacks home.

2. A belt fastener, comprising an apertured plate provided on its under side around the apertures thereof, with conical tubular bosses having cutting edges, said bosses being of a length less than the thickness of the belt and adapted to be driven into the belt, and tacks adapted to be driven through the apertures of the belt and their bosses and clenched on the inner face of the belt.

EUGENE SEAVEY.

Copies of this patent may be obtained for five cents each, by addressing the "Commissioner of Patents, Washington, D. C."